United States Patent [19]
Achurch et al.

[11] Patent Number: 5,108,173
[45] Date of Patent: Apr. 28, 1992

[54] ORIENTATING OPTICAL FIBRES

[75] Inventors: Nicholas E. Achurch, Woodbridge; Ian P. Copple, Stowmarket; Stephen A. Cassidy, Ipswich, all of England

[73] Assignee: British Telecommunications public limited company, London, England

[21] Appl. No.: 663,889

[22] PCT Filed: Aug. 18, 1989

[86] PCT No.: PCT/GB89/00962
§ 371 Date: Mar. 19, 1991
§ 102(e) Date: Mar. 19, 1991

[87] PCT Pub. No.: WO90/02314
PCT Pub. Date: Mar. 8, 1990

[30] Foreign Application Priority Data
Aug. 18, 1988 [GB] United Kingdom ............... 8819651

[51] Int. Cl.⁵ ............................................ G01N 21/84
[52] U.S. Cl. ................................. 356/73.1; 65/3.11
[58] Field of Search ...................... 356/73.1; 65/3.11

[56] References Cited
U.S. PATENT DOCUMENTS

| | | | |
|---|---|---|---|
| 3,088,297 | 5/1963 | Kapany et al. | 65/13 |
| 4,102,661 | 7/1978 | Dudderar et al. | 65/2 |
| 4,668,264 | 5/1987 | Dyott | 65/3.11 |
| 4,686,361 | 8/1987 | Bard | 250/221 |

FOREIGN PATENT DOCUMENTS 2354295 5/1974 Fed. Rep. of Germany.
2817769 10/1979 Fed. Rep. of Germany.

Primary Examiner—Vincent P. McGraw
Attorney, Agent, or Firm—Nixon & Vanderhye

[57] ABSTRACT

A method and apparatus for setting the orientation of an optical fibre (6) having at least one planar section extending along its length comprises a light source (3) for generating a beam of light which impinges on the fibre (6). Light reflected by the fibre is detected by a light detector (5) and the fibre is rotated by means of a tube (1) into which it is inserted while the intensity of the detected light is monitored. When the intensity becomes a maximum then the planar face is facing in a known direction.

20 Claims, 5 Drawing Sheets

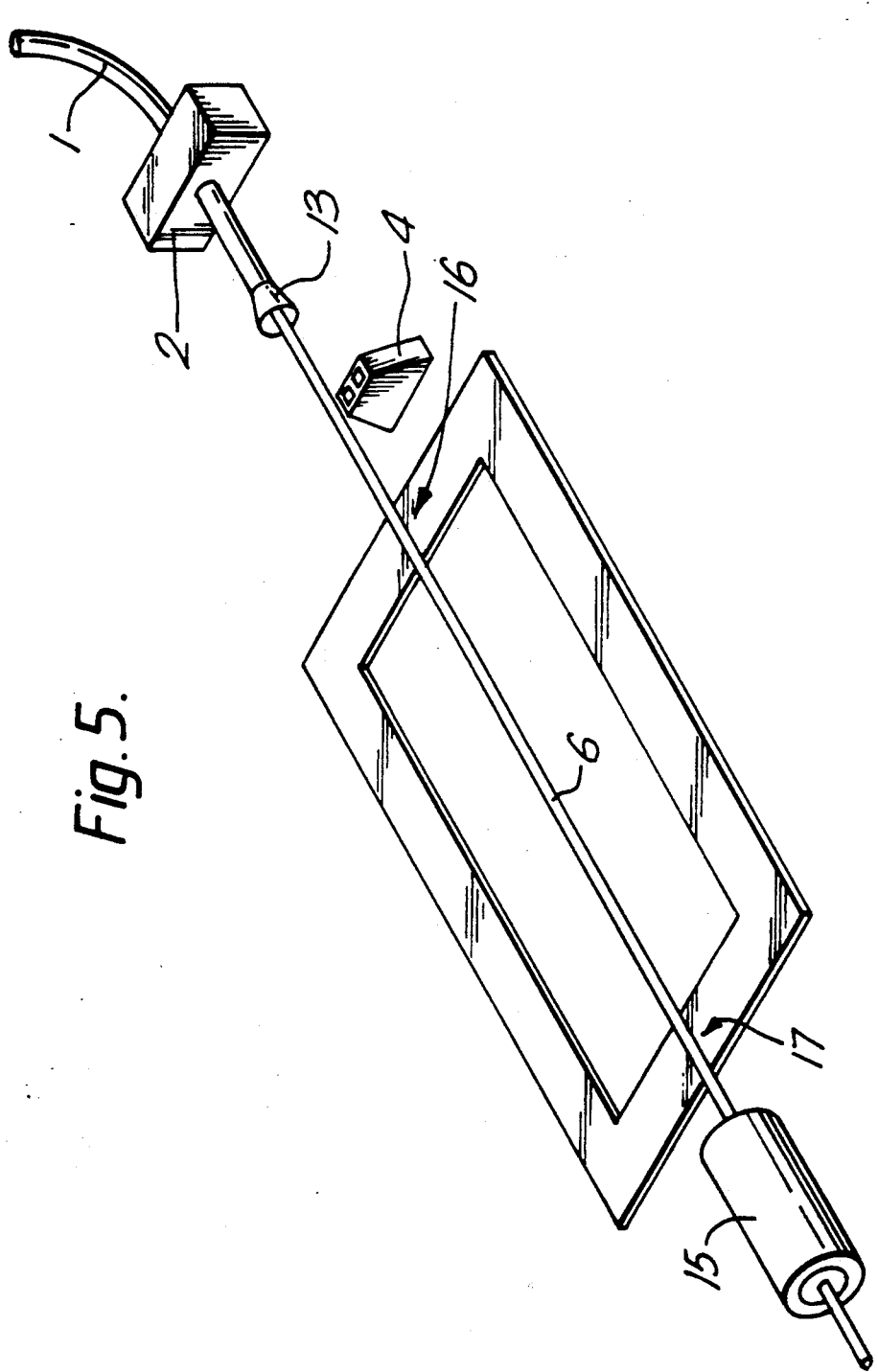

ORIENTATING OPTICAL FIBRES

The invention relates to methods and apparatus for setting the orientation of an optical fibre having at least one planar section extending along its length.

Optical fibres have recently been developed which, instead of having a conventional circular cross-section, have a semi-circular section. These fibres are known as D-fibres. D-fibres provide a relatively simple means of access to the fibre core and can form the basis of several fibre-based devices.

In order to fabricate a device incorporating such a fibre, it is necessary to identify the planar section or flat on the fibre. In practice, identifying a parallel flat section on a fibre of only 125 micron diameter and orientating it correctly is not simple. One method which has been used in the past is to allow the D-fibre to bend since, because of its cross-section, this fibre is forced to orientate itself such that the flat lies to the inside or outside of the bend. A previous method of identification simply involved holding a length of fibre horizontally and allowing one end to droop down. This resulted in a tendency for the flat to lie up or down and by careful scrutiny of the light reflected from the flat surface it was possible to identify the flat. This method has several disadvantages: it is very operator dependant, unreliable, difficult to see the reflected light, and even when the flat has been identified the fibre still has to be rotated into the correct orientation for mounting.

In accordance with the one aspect of the present invention, a method of setting the orientation of an optical fibre having at least one planar section extending along its length comprises irradiating the fibre with a beam of radiation, monitoring radiation reflected by the fibre, and rotating the fibre until the intensity of the monitored radiation reaches a maximum or exceeds a threshold.

In accordance with a second aspect of the present invention, apparatus for setting the orientation of an optical fibre having at least one planar section extending along its length comprises a fibre support assembly including rotatable means whereby an optical fibre may be supported and rotated; and detection means for irradiating at least one region of the fibre with a beam of radiation sensing radiation reflected by the fibre, and indicating when the intensity of the sensed radiation reaches a maximum or exceeds a threshold.

We have devised a method and apparatus which enables the orientation of these optical fibres to be set automatically with a minimum of operator intervention. The invention makes use of the fact that the optical fibre will not reflect light equally while it is rotated, the maximum amount of reflection occurring when the radiation beam impinges on the flat.

Typically, the radiation will comprise optical radiation, such as infra-red radiation generated by a light emitting diode but other types of radiation are also suitable.

In one preferred embodiment, the method comprises a preliminary step of imparting a bend in the optical fibre. This has the advantage of restricting the location of the planar section, in the case of a D-fibre, to one of two orientations and thus reduces the uncertainty involved in locating the planar section. The rotating means preferably comprises a rotably mounted curved guide. This provides a simple way of controlling the orientation of the optical fibre and at the same time, as explained above, limits the position of the planar section to one or two orientations thereby simplifying the setting steps. Furthermore, the orientation will be fixed. Typically, the curved guide will comprise a curved tube similar to a hyperdermic.

The invention is particularly suited to the automatic generation of optical fibre sections of known orientation and the method preferably comprises setting the orientation of each end of a section of optical fibre to be substantially the same by performing a method according to the first aspect of the invention, clamping the ends and thereafter severing the section of optical fibre adjacent to the clamped ends. The cut section of optical fibre can then be set into an optical device in a conventional manner. Preferably, therefore, the apparatus further comprises clamping means for clamping the optical fibre at the desired orientation.

Preferably, the support assembly comprises bearing means for rotatably supporting a section of the optical fibre. For example, the optical fibre may be supported at one end by an air bearing and at the other end by the rotatably mounted curved guide, when provided.

In one example, the detection means is adapted to irradiate two regions of the fibre spaced apart along its length so as to set the orientation of each of those regions to ensure that the fibre is not twisted.

The invention can also be adapted to set the orientation of an array of optical fibres each of which has at least one planar section extending along its length in which case the support assembly is adapted to support a number of optical fibres, and the detection means and support assembly are relatively movable so that the orientation of each supported fibre can be set in turn. Alternatively, the detection means could comprise separate detectors one for each fibre so that relative movement would not be required.

Typically, in order to be able to set the orientation of closely spaced fibres, the detection means includes a mask positioned between a radiation source and a radiation sensor of the detection means to prevent the radiation sensor sensing radiation reflected by fibres other than the one whose orientation is to be set.

In a further preferred embodiment, the apparatus forms part of a fibre drawing plant. Preferably the apparatus is operatively connected with means for rotating the optical fibre in such a way that a desired fibre orientation can be maintained. Preferably the means for rotating the optical fibre form part of the fibre drawing mechanism, more preferably the means for rotating the fibre also advances the fibre in the drawing process.

Although the invention is primarily concerned with the orientation of D-optical fibres, it may also be applied to optical fibres having more than one planar section.

Some examples of methods and apparatus in accordance with the present invention will now be described with reference to the accompanying drawings, in which:

FIG. 5 illustrates the support assembly for the FIG. 2 example;

Figure 2:
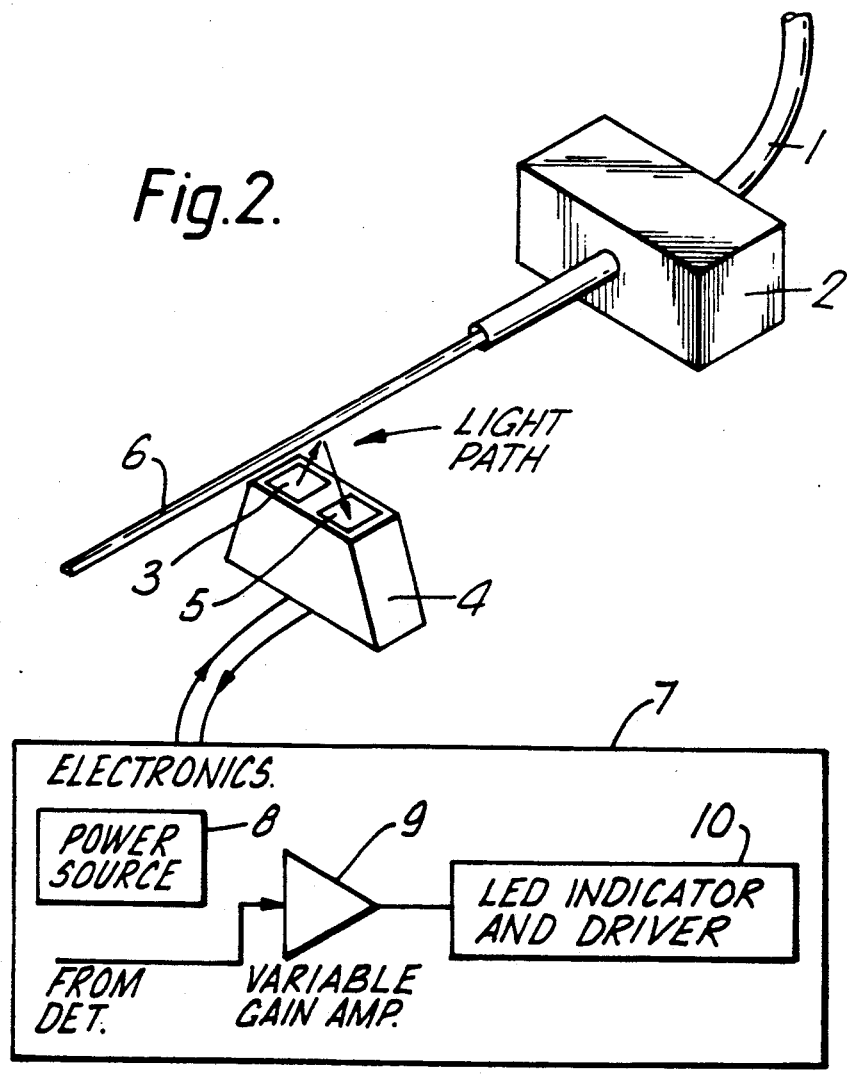
FIG. 2 is a schematic, block diagram of part of one example of the apparatus.

The apparatus shown in FIG. 2 comprises a hyperdermic tube 1 which has been bent through an angle of about 90° and which is pivoted at one end by a simple bearing 2. An optical source, such as a light emitting diode 3 is mounted in a support block 4 adjacent to a light detector 5 such as a photodiode. The block 4 is positioned beneath a D-optical fibre adjacent to where it enters the hyperdermic tube 1. Typically, the diameter of the D-fibre is 125 microns while the diameter of the tube is about 0.75 mm.

The light source and sensor 3, 5 are coupled with the electronics 7 including a power source 8 coupled with the light source 3 and a variable gain amplifier 9 coupled with the light sensor 5. The amplifier 9 amplifies the output from the light sensor 5 and this drives a light emitting diode indicator 10 whenever the output signal from the amplifier 9 exceeds a threshold T.

Figure 4:
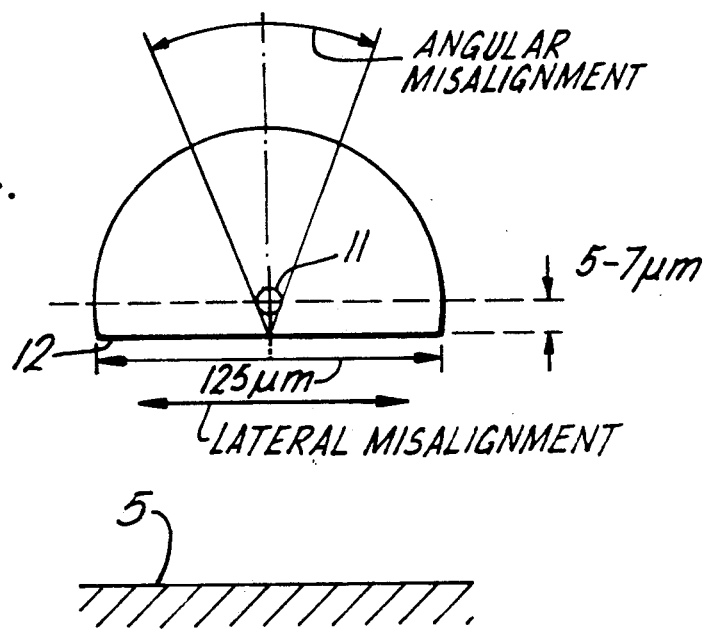
FIG. 4 illustrates the cross-section of a typical D-fibre.

In use, one end of the fibre 6 is inserted into the tube 1 is pushed into the bent portion. This orientates the fibre 6 such that the planar or flat surface of the fibre lies to the inside or outside of the bend and retains the orientation when the tube 1 is rotated. As can be seen in FIG. 4, the D-fibre has a generally semi-circular cross-section with the core region 11 adjacent to the flat 12.

With the tube 1 orientated horizontally as shown in FIG. 2, the flat 12 either lies face down or face up. If the flat is face down then the light transmitted from the source 3 will be reflected by the flat 12 and be received by the sensor 5 with a sufficient intensity to cause the LED indicator 10 to light. If the flat 12 is face up, however, only a small proportion of the light from the source 3 will be reflected onto the sensor 5 so that the received intensity is less than the threshold and the LED indicator 10 will not light. By rotating the tube 1 within the bearing 2, the fibre 6 will also be rotated and as soon as the flat 12 is substantially face down the sensor 5 will detect sufficient light to cause the LED indicator 10 to light and the orientation of the fibre 6 will then be known.

Figure 1:
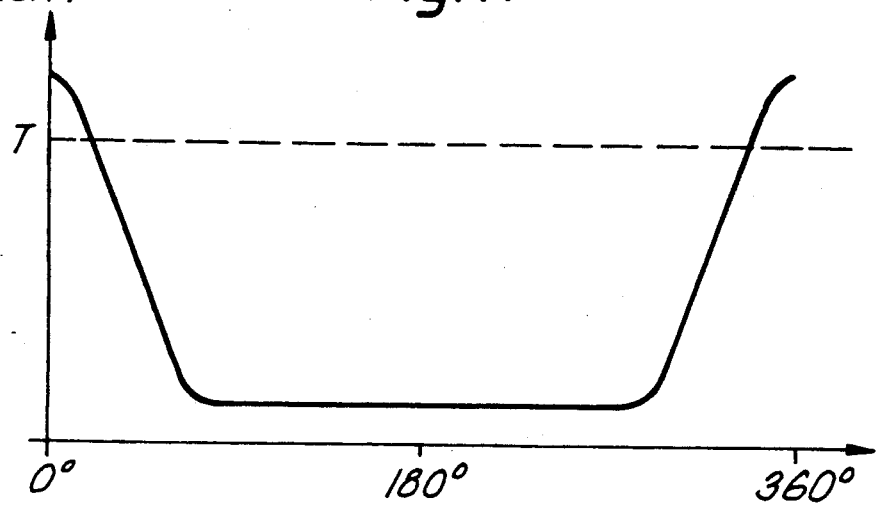
FIG. 1 illustrates graphically the variation in intensity of reflected light with the angle of rotation of the optical fibre.

The variation in intensity of the reflected light with rotation angle of the fibre is illustrated in FIG. 1. It is assumed in FIG. 1 that at 0° the flat 12 will be face down so that the intensity of the light received by the sensor 5 is at a maximum level. As the fibre is rotated through 180°, the intensity will gradually decrease to a minimum and thereafter increase back to the maximum after a full 360° rotation. The threshold intensity level T is set empirically so as to correspond to the fibre being in a satisfactory orientation.

Figure 3:
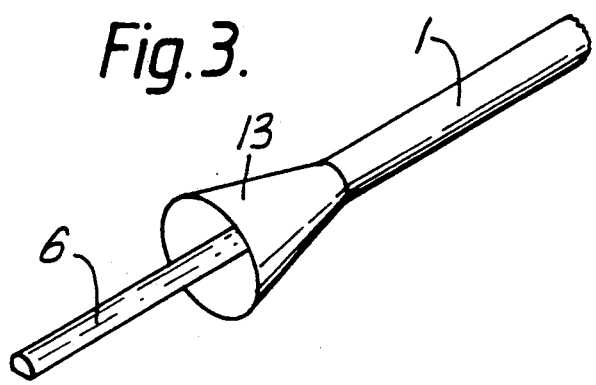
FIG. 3 illustrates a modification to the end of the tube shown in FIG. 2.

Typically, as in this example, the bore of the tube 1 will be several times the diameter of the fibre 6. In addition, the leading end of the tube may be provided with a belled end 13 to aid insertion of the fibre 6 (FIG. 3).

The support assembly for the fibre 6 is shown in more detail in FIG. 5. The support assembly comprises a rectangular support block 14 onto which the fibre 6 is clamped using clamp members (not shown) once the orientation of the fibre is set. The end of the fibre opposite to the tube 1 is supported in an air bearing 15. Typically, the fibre will be supplied from a spool after removal of its coating through the air bearing 15, across the support member 14 and into the tube 1. Initially, the orientation of the fibre will be set as explained above adjacent to the bearing 15 and then the fibre will be clamped at the region 17 to the support member 14. A similar setting of the orientation of the fibre 6 will then be performed adjacent the tube 1 using another detector (not shown) and the fibre will then be clamped at the region 16. At this point, the orientation of the section of fibre between the region 16, 17 is known and this section of fibre can then be cut or cleaved in a conventional manner and set into the device to be constructed. The clamps are released and the portion of the fibre downstream of the region 16 is discarded and then a further length of optical fibre is supplied via the air bearing 15 into the tube 1 to allow the operation to be repeated.

The system sensitivity may be set by adjusting the gain of the operational amplifier 9, the higher the gain the more tolerant the system is to lateral and angular misalignment of the D-fibre. For example, with the distance between the fibre and the sensor 5 set to 5 mm, the following results for the flat detection were obtained (see FIG. 4).

Sensitivity Set to Maximum:
  lateral misalignment = ±1.65 mm
  angular misalignment = ±35°

Sensitivity Set to Minimum:
  lateral misalignment = ±0.25 mm
  angular misalignment = ±approx 1°.

Figure 7:
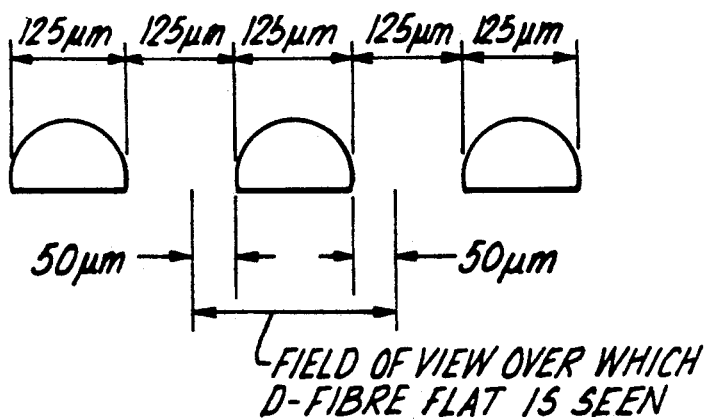
FIG. 7 illustrates the resolution of the apparatus shown in FIG. 6.
Figure 6:
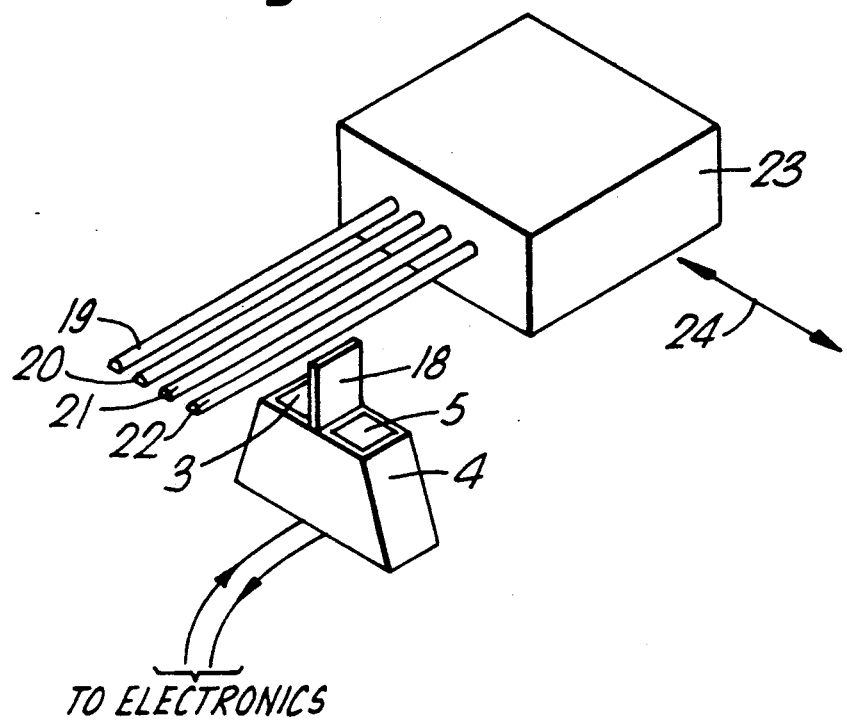
FIG. 6 illustrates part of a second example of the apparatus for setting the orientation of an array of fibres.
Figure 8:
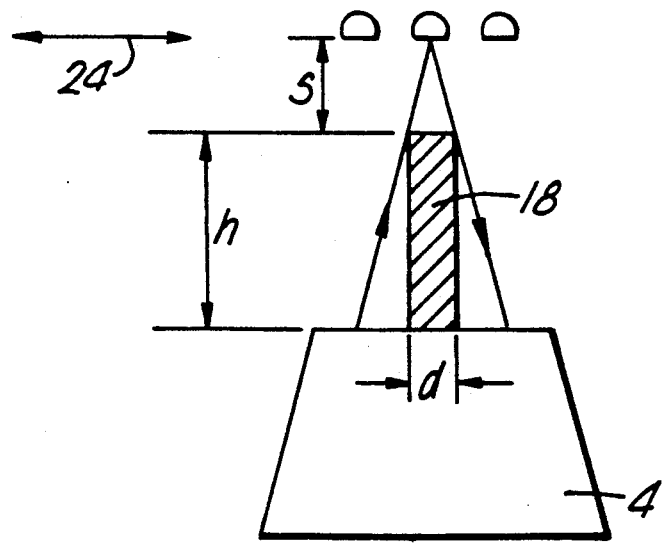
FIG. 8 illustrates the position of the mask used in the FIG. 6 example.
Figure 9:
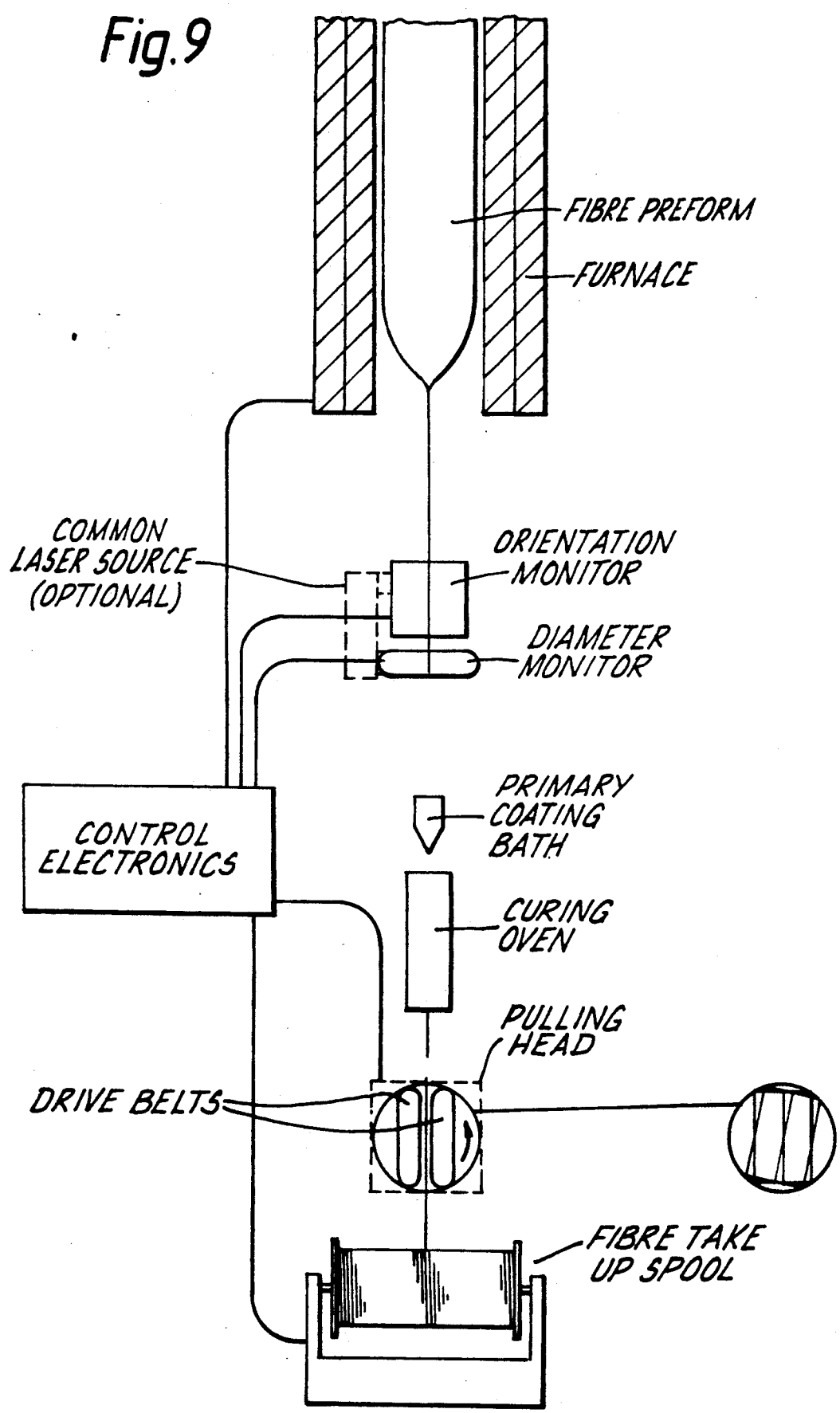
FIG. 9 illustrates schematically how fibre orientating apparatus according to the invention can be incorporated into a fibre pulling rig.

When assembling arrays of two or more fibres side by side it will be necessary to detect the flat of each fibre in turn without the presence of the adjacent flats affecting the measurement. To do this the horizontal resolution must be improved from that obtained by the arrangement shown in FIG. 2. One solution to this is illustrated in FIGS. 6 and 7. In this case, a mask 18 is mounted on the block 4 between the light source 3 and the sensor 5. By adjusting the width d, height h, and spacing of the mask from the array s (FIG. 8) there will only be a very small distance laterally over which the fibre may be placed where it will be "seen".

In operation, the block 4 is fixed and the array of four, substantially parallel fibres 19–22 mounted to a substrate 23 is moved over the block in the direction shown by the arrow 24. Due to the presence of the mask, each fibre will be seen individually in turn and can be orientated using the method previously described.

With this system a resolution as small as ±50 microns has been obtained which is better than that required by individual flats spaced only one fibre width apart as may be seen in FIG. 7.

The orientation device according to the invention finds particular application in conjunction with a D-fibre drawing rig, that is during the production of D-fibre from a perform, where the orientation of the fibre is monitored and, via a feedback loop, controlled in order to avoid the unwanted incorporation of twist or torsion in the fibre. Built in torsion is generally undesirable because, when the fibre is cleaved, as for example is normally prior to jointing or splicing, instead if the desired normal end face an off-normal end face is produced. The angle by which the end face is off-normal to the fibre longitudinal axis is termed the "end angle".

End angles of more than 1° or 2° are generally unacceptable as they lead to excessive splice losses. While torsion in conventional circularly symmetric fibre would similarly lead to undesirable end angles, in practice, circular section optical fibres do not acquire torsion during pulling, so not special efforts are required to control it. It may be that the asymmetrical shape of D-fibres is the root cause of the problem, but whatever the cause torsion need to be controlled.

A detector head according to the invention can be set up to monitor fibre orientation in the region where the fibre emerges from the furnace, that is before the point at which the fibre is provided with its primary coating. Advantageously, in place of the LED source mentioned earlier, a laser, for example a helium-neon laser, is used as the optical source in the detector head. The use of a laser enables the source and detectors to be mounted at a significant distance from the fibre being drawn. Conveniently but not essentially, the laser may also serve as the optical source for the diameter sensing arrangement of the type routinely used in conventional fibre drawing. Advantageously, in such an arrangement beam splitting means maybe provided to direct separate beams or beam portions at the fibre for the separate functions. The beam splitting means may comprise an optical fibre. In such diameter sensing a laser beam or possibly two laser beams are arranged to impinge on the fibre being drawn, the beam or beams being orthogonal to the fibre direction. The laser light shining on the fibre creates a diffraction pattern, which appears as a sequence of light and dark spots. The diffraction pattern subtends a greater angle if the fibre diameter decreases, and subtends a smaller angle if the fibre diameter increases. The diffraction pattern is monitored, the output of the monitoring detector means being used to control, via a feedback loop, the pulling speed of the fibre and hence the fibre diameter. The control of fibre torsion can be effected by rotating the furnace end of the fibre pulling line or, preferably and more conveniently, by effecting a controlled rotation of the fibre at the pulling end of the line. Conveniently the conventional pulling head which comprises a capstan wheel or roller, typically of metal, with one or more associated pinch wheels or rollers is replaced by a pulling head in which belts act on the fibre to provide the pulling force. Such a pulling head may conventiently comprise a pair of facing drive belts, the direction of motion of the two drive belts and the fibre being essentially in line in one plane, but the relative inclination being adjustable so that a controlled degree of twist may be added to the fibre as it is advanced at a controllable rate. Such pulling heads are in themselves known, being sold as means of adding a controlled degree of twist to conventional fibre in order to give the fibre particular desired properties. The orientation detector according to the present invention provides a convenient source of orientation information about a moving fibre, which information can be used by the microprocessor or computer which controls the pulling head or whole pulling rig to control the level of twist built into a D-fibre during production.

We claim:

1. A method of setting the orientation of an optical fibre having at least one planar section extending along its length, the method comprising irradiating the fibre with a beam of radiation, monitoring radiation reflected by the fibre, and rotating the fibre until the intensity of the monitored radiation reaches a maximum or exceeds a threshold.

2. A method according to claim 1, wherein the radiation comprises optical radiation.

3. A method according to claim 1 the method being implemented as part of a fibre production process.

4. A method according to claim 3 wherein the fibre production process includes forming the fibre from a heated preform, coating the fibre with a primary coating, and passing the coated fibre through fibre advancing means, said beam of radiation being arranged to impinge on the fibre while it is advanced and at a point before that at which the fibre is provided with the primary coating.

5. A method according to claim 3 wherein the orientation of the fibre as it is pulled is initially adjusted to a desired orientation, the intensity of radiation being monitored, intentional rotation of the fibre being effected subsequently during the pulling process only as necessary to maintain the desired orientation as determined by the monitored radiation level.

6. A method according to claim 1 wherein the radiation is visible or infra-red light from a laser source.

7. A method according to claim 1, further comprising a preliminary step of imparting a bend in the optical fibre.

8. A method of generating a section of optical fibre of known orientation, the method comprising setting the orientation of each end of a section of optical fibre to be substantially the same by perfoming a method according to claim 1, clamping the ends and thereafter severing the section of optical fibre adjacent to the clamped ends.

9. Apparatus for setting the orientation of an optical fibre having at least one planar section extending along its length, the apparatus comprising a fibre support assembly including rotatable means whereby an optical fibre may be supported and rotated; and detection means for irradiating at least one region of the fibre with a beam of radiation, sensing radiation reflected by the fibre, and indicating when the intensity of the sensed radiation reaches a maximum or exceeds a threshold.

10. Apparatus according to claim 9, wherein the detection means includes a light emitting diode for generating the beam of radiation.

11. Apparatus according to claim 9, wherein the rotating means comprises a rotatably mounted curved guide.

12. Apparatus according to claim 11, wherein the curved guide comprises a curved tube.

13. Apparatus according to claim 9, wherein the support assembly comprises bearing means for rotatably supporting a section of the optical fibre.

14. Apparatus according to claim 9, wherein the detection means is adapted to irradiate two regions of the fibre spaced apart along its length so as to set the orientation of each of those regions.

15. Apparatus according to claim 9, wherein the apparatus further comprises clamping means for clamping the optical fibre at the desired orientation.

16. Apparatus for setting the orientation of an array of optical fibres each of which has at least one planar section extending along its length, the apparatus comprising apparatus according to claim 9, the support assembly being adapted to support a plurality of optical fibres, and the detection means and support assembly being relatively movable so that the orientation of each supported fibre can be set in turn.

17. Apparatus according to claim 16, wherein the detection means includes a mask positioned between a radiation source and a radiation sensor of the detection means to prevent the radiation sensor sensing radiation reflected by fibres other than the one whose orientation is to be set.

18. Apparatus according to claim 9 wherein the fibre support assembly is part of a fibre drawing plant, the fibre section which is to be orientated extending generally vertically between preform heating means and fibre pulling means, torsion control means being provided to control the degree of torsion incorporated into the fibre being pulled between the preform heating means and the fibre pulling means, the torsion control means being controllable in response to the output of said detection means.

19. Apparatus according to claim 18 wherein said fibre pulling means and said torsion control means are combined.

20. Apparatus according to claim 19 wherein the fibre pulling means comprises a pair of drive belts between which the fibre is gripped, an angle between the drive directions of the two belts being adjustable to adjust the degree of twist given to the fibre as it is advanced.

* * * * *